UNITED STATES PATENT OFFICE.

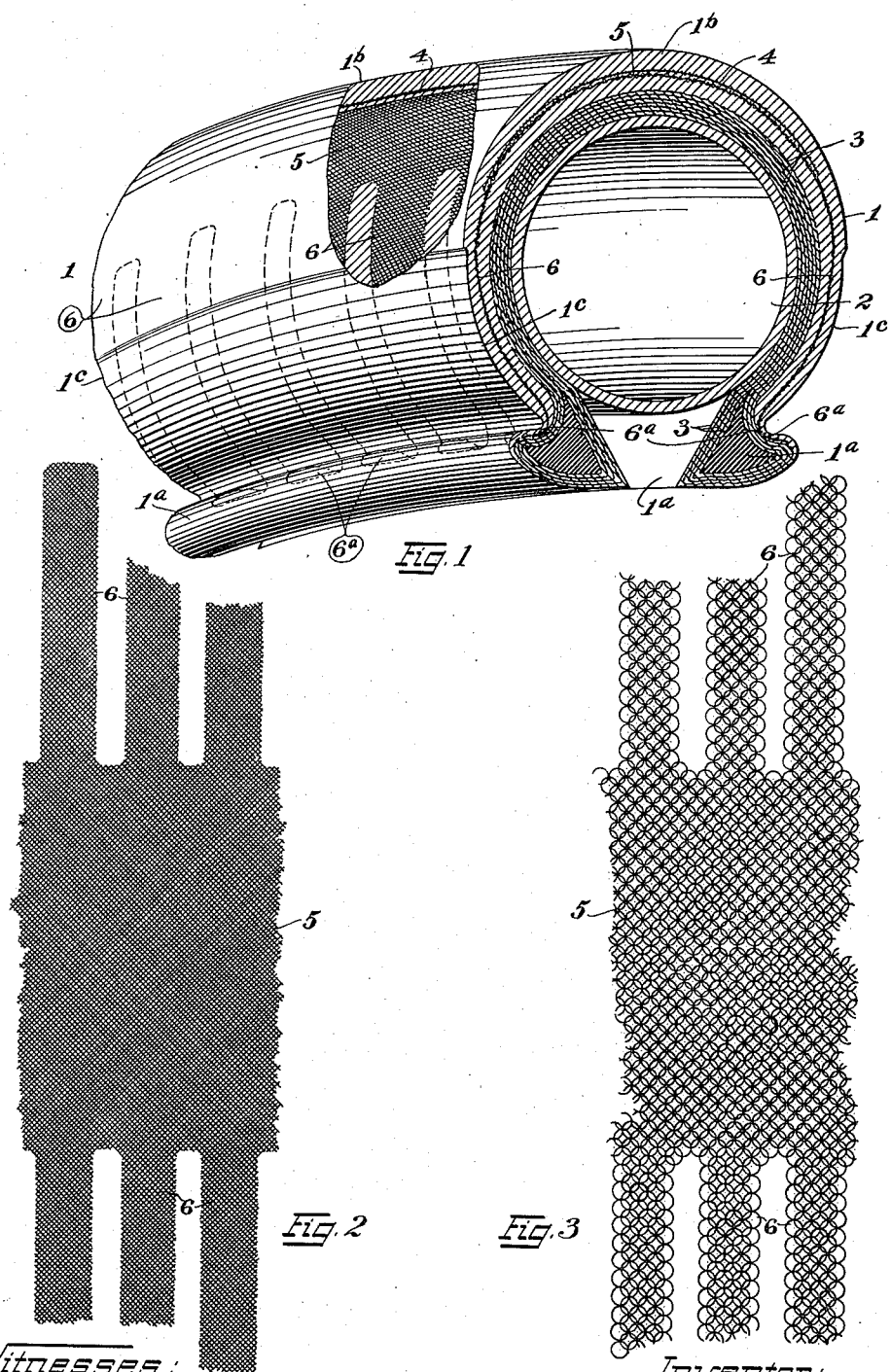

WILLIAM H. EYNON, OF CLEVELAND, OHIO.

ARMORED TIRE.

963,882.  Specification of Letters Patent.  Patented July 12, 1910.

Application filed July 22, 1909. Serial No. 508,940.

*To all whom it may concern:*

Be it known that I, WILLIAM H. EYNON, a citizen of the United States, residing at Cleveland, in the county of Cuyahoga and State of Ohio, have invented certain new and useful Improvements in Armored Tires, of which the following is a specification.

My invention relates to improvements in armored tires, and more particularly, to improvements in pneumatic tires of either the "single-tube" or "double-tube" type.

The primary object of the invention is to provide a generally-improved non-puncturable tire of this class of simple, cheap, and efficient construction adapted to provide increased durability and reduce the cost of maintenance of such tires.

Practical experience in the use of pneumatic tires has demonstrated that the maximum destruction or wear and tear of the tire is not due to punctures or excessive wear upon the tread of the tire, but that in the class of tires which use a separate cover, such as the "Dunlop" or "clencher" tires, or in the cylindrical tire the greatest deterioration is due to the constant changes in the material of which the tires are made by the flexure of the tire on its sides between the tread of the tire and its bearing on the rim of the wheel. In the covers or casings of the Dunlop and clencher type of tires this flexure is very pronounced and weakens the sides of the cover very rapidly, and this flexure causes the canvas to break in successive layers from the outside inwardly circumferentially under the tread of the tire. This deterioration of the fabric body is also augmented by the friction of the body of air under high pressure within the tire as it is displaced by the revolution of the wheel due to the high degree of heat generated in the tire by the moving body of air.

The purpose of this invention is to protect the fabric body of the outer tire casing and reinforce the latter for the purpose of preventing punctures and blow-outs, and at the same time providing a tire casing which is not affected by flexure or friction and is capable of sustaining a high degree of pressure applied to the air used to inflate the tire.

With the above mentioned ends in view, the invention consists in the novel construction, arrangement, and combination of parts, hereinafter described, illustrated in one of its embodiments in the accompanying drawings, and particularly pointed out in the appended claims.

Referring to the drawings, forming a part of this specification, Figure 1, is a perspective view of a section of a tire constructed in accordance with my invention. Fig. 2, a detail plan view of a section of the metallic armor fabric in the form of close-mesh woven wire. Fig. 3, a similar view of the same in the form of mail-armor consisting of interlinked rings.

Similar numerals of reference designate like parts throughout all the figures of the drawings.

The present embodiment of the invention shows a tire of the "double-tube" type consisting of a sheath or tire-casing 1, and an inner inflatable tube 2. The sheath or tire casing may be reinforced in any suitable and convenient manner by means of a vegetable or canvas fabric body comprising layers of fabric 3, suitably disposed and incorporated and preferably extending into the heel portions 1ª, of the tire casing as shown.

The tread portion 1ᵇ, of the tire casing may be of any suitable and convenient form and may be provided with a "breaker-strip" 4, consisting of one or more strips of fabric as desired.

The breaker-strip, as its name implies, affords a limited protection to the fabric body 3, at the tread portion of the tire.

As heretofore pointed out, the deterioration of the tire casing is greatest at the sides where subjected to greatest flexure, and as a consequence what are known as "blow-outs" frequently occur in these portions of the tire.

As a means for effectually reinforcing the outer tire casing or sheath and protecting the fabric body 3, thereof, a metallic armor fabric is embedded and vulcanized therein, said armor fabric comprising a main body or tread portion 5, terminating at its sides in a series of anchor strips 6, arranged at suitable intervals and extending transversely in the sides 1ᶜ, of the tire casing. The main body portion 5, of the armor fabric extends throughout the tread portion of the sheath or tire casing and the transversely disposed anchor strips 6, preferably extend into the heel portions 1ª, terminating in hooked portions 6ª, effectually reinforcing the heel portions 1ª, of the tire casing and strengthening the sides of the tire casing 1°, for the purpose of preventing "blow-outs" as above referred to.

The metallic fabric preferably comprises flexible mail-armor as indicated in Fig. 3, of the drawings, but may be composed of close-mesh woven wire fabric as indicated in Figs. 1, and 2, of the drawings.

If the "breaker-strip" 4, is retained as a feature of construction in the tire casing, it is preferably disposed just outside of the main body portion 5, of the armor fabric, and the anchor strips 6, may be of any suitable dimensions and disposed at such intervals as may be found most effective for affording the requisite elasticity and reinforcement in the sides 1°, of the tire casing.

From the foregoing description, taken in connection with the accompanying drawings, the operation and advantages of my invention will be readily understood.

Having thus described an embodiment of my invention, what I claim and desire to secure by Letters Patent is,—

1. An armored-tire, comprising a sheath having embedded therein a flexible metallic armor consisting of a main body portion extending throughout the tread portion of said sheath and provided with portions of substantial width and separate from each other disposed in the sides of said sheath.

2. An armored-tire, comprising a sheath, and a flexible metallic armor embedded therein comprising a tread portion provided with a plurality of transversely disposed portions of substantial width and separate from each other terminating in the heel portions of said sheath.

In testimony whereof I have affixed my signature, in presence of two witnesses.

WILLIAM H. EYNON.

Witnesses:
O. C. BILLMAN,
E. L. BROWN.